United States Patent [19]

Iwasaki

[11] Patent Number: 4,938,572
[45] Date of Patent: Jul. 3, 1990

[54] ZOOM LENS SYSTEM FOR USE IN MICROFILM PROJECTION APPARATUS

[75] Inventor: Satoshi Iwasaki, Osaka, Japan

[73] Assignee: Minolta Camera Kabushiki Kaisha, Osaka, Japan

[21] Appl. No.: 284,316

[22] Filed: Dec. 14, 1988

[30] Foreign Application Priority Data

Dec. 19, 1987 [JP] Japan .................. 62-321790

[51] Int. Cl.$^5$ ............................... G02B 15/00
[52] U.S. Cl. .................... 350/423; 350/427; 350/450
[58] Field of Search ............. 350/474, 423, 427, 449, 350/450

[56] References Cited

U.S. PATENT DOCUMENTS 4,303,311 12/1981 Nakamura ................... 350/427
4,449,791 5/1984 Terasawa et al. .

FOREIGN PATENT DOCUMENTS 57-73715 8/1982 Japan .
62-123421 4/1987 Japan .

Primary Examiner—Paul M. Dzierzynski
Attorney, Agent, or Firm—Price, Gess & Ubell

[57] ABSTRACT

A zoom lens system for use in a microfilm projection apparatus, having from enlargement side a first lens unit of a negative refractive power, a second lens unit of a positive refractive power and a third lens unit of a negative refractive power and including an aperture stop positioned within the second lens unit or in the vicinity thereof. The first lens unit consists of one or more meniscus lens elements each having a concave surface faced to the reduction side and the third lens unit consists of one or more meniscus lens elements each having a concave surface faced to the enlargement side. Zooming operation from the longest focal length side to the shortest focal length side is carried out by linearly moving both the second and third lens units to the reduction side along the optical axis while first lens unit is fixed. Such structure reduces a distortion as well as a variation thereof during the zooming operation. Moreover, the fixed location of the first lens unit reduces the length of the whole zoom lens system to thereby provide it being compact.

12 Claims, 4 Drawing Sheets

Feff=11
-0.3  0.3
Spherical Aberration

ω=12°
DS ——— d
DT --- d
-0.3  0.3
Astigmatism

ω=12°
0.05 0 0.05%
Distortion

Feff=9.4
-0.3  0.3
Spherical Aberration

ω=12°
DS ——— d
DT --- d
-0.3  0.3
Astigmatism

ω=12°
-0.05 0 0.05%
Distortion

Feff=8.0
-0.3  0.3
Spherical Aberration

ω=12°
DS ——— d
DT --- d
-0.3  0.3
Astigmatism

ω=12°
-0.10 -0.5 0.00%
Distortion

Feff = 10.8
— d
—·— g
—··— c
-0.3   0.3
Spherical Aberration

ω=12°
DS ——— d
DT ----- d
-0.3   0.3
Astigmatism

ω=12°
0  0.05  0.10%
Distortion

Feff= 9.2
— d
—·— g
—··— c
-0.3   0.3
Spherical Aberration

ω=12°
DS ——— d
DT ----- d
-0.3   0.3
Astigmatism

ω=12°
-0.05  0   0.05%
Distortion

Feff = 8.0
— d
—·— g
—··— c
-0.3   0.3
Spherical Aberration

ω=12°
DS ———
DT ----- d
-0.3   0.3
Astigmatism

ω=12°
0  0.05  0.10%
Distortion

ZOOM LENS SYSTEM FOR USE IN MICROFILM PROJECTION APPARATUS

BACKGROUND OF THE INVENTION

1. Field of the Invention:

The present invention relates to a zoom lens system for use in a microfilm projection apparatus such as a microfilm reader, a microfilm reader printer or the like, and more particularly to a zoom lens system for projecting an image of a microfilm in a high magnification range with a sufficiently reduced distortion.

2. Description of the Related Arts:

Conventionally, a zoom lens system is used in a microfilm projection apparatus for projecting an image recorded on a microfilm with a variable magnification. As the microfilm holds several kinds of images, they often include maps and figures. Therefore, it is necessary to sufficiently reduce a distortion of the zoom lens system in order to project such images exactly.

One proposal is shown in Japanese Laid-Open patent Application No. 62-123421 which discloses a zoom lens system for use in a copying machine. The zoom lens system disclosed in the prior art has about an equal magnification range due to usage in the copying machine. On the contrary, a zoom lens system in a microfilm projection apparatus is required to have a high magnification range such as 7× and more. Therefore, both zoom lens system are quite different from each other in structure as well as from a viewpoint of aberration correction.

SUMMARY OF THE INVENTION

Accordingly, an object of the present invention is to provide a zoom lens system for use in a microfilm projection apparatus having a sufficiently corrected aberration.

Another object of the present invention is to provide a zoom lens system for use in a microfilm projection apparatus having a sufficiently reduced distortion.

Still another object of the present invention is to provide a zoom lens system which is clear and compact.

These and other objects of the present invention can be accomplished by providing a zoom lens system for use in a microfilm projection apparatus, the zoom lens system having, from enlargement side, a first lens unit of a negative refractive power, a second lens unit of a positive refractive power and a third lens unit of a negative refractive power and including an aperture stop positioned within said second lens unit or in the vicinity thereof, said first lens unit consisting of one or more meniscus lens elements each having a concave surface faced to the reduction side and said third lens unit consisting of one or more meniscus lens elements each having a concave surface faced to the enlargement side, wherein said second and third lens units are moved to the reduction side along the optical axis while said first lens unit is fixed in an operation of zooming from the longest focal length side to the shortest focal length side.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The following description is provided to enable any person skilled in the optical art to make and use the present invention and sets forth the best modes contemplated by the inventor of carrying out his invention. Various modifications, however, will remain readily apparent to those skilled in the art, since the generic principles of the present invention have been defined herein specifically to provide a zoom lens system.

In the accompanying drawings which supplement the following tables, zoom lens systems in accordance with the present invention are illustrated diagrammatically. The individual lenses are designated by the letter L with a subscript number (typed as an adscript number) corresponding to the consecutive numbers of the lenses from the enlargement side to the reduction side. The radii of curvature of the lenses are indicated by the letter r with a subscript number (typed as an adscript number) corresponding to the consecutive numbers of the lenses. The axial distances, d, along the optical axis are set forth in the tables and include both the axial spacings between the lenses and the thicknesses of the lenses. Finally, the refractive indexes, N, and Abbe numbers, $\nu$, are provided in each of the tables.

Figure 1A:
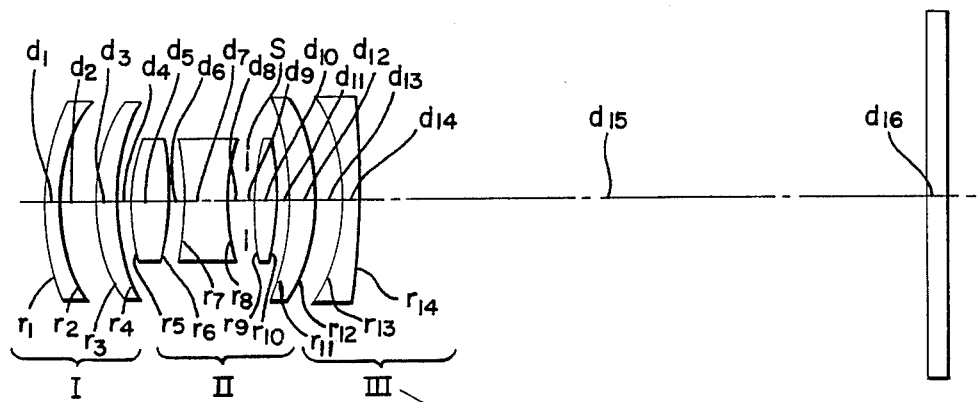
FIGS. 1A and 1B are diagrams in section showing a zoom lens system applying a first embodiment of the present invention at the longest focal length side and at the shortest focal length side, respectively.
Figure 1B:
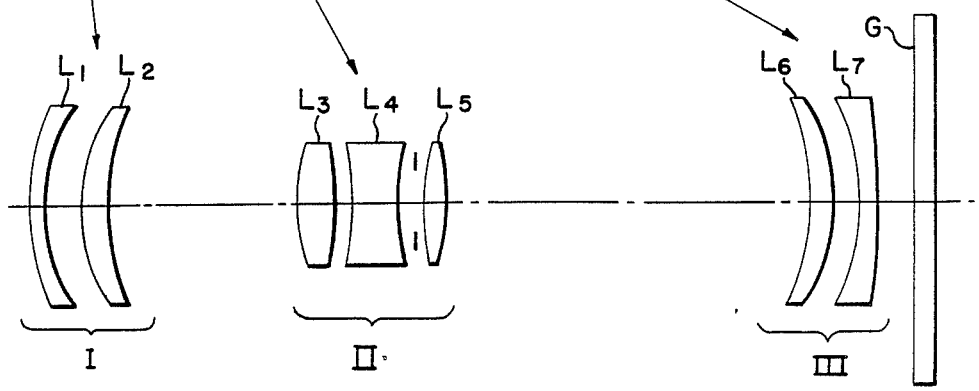
Figure 2A:
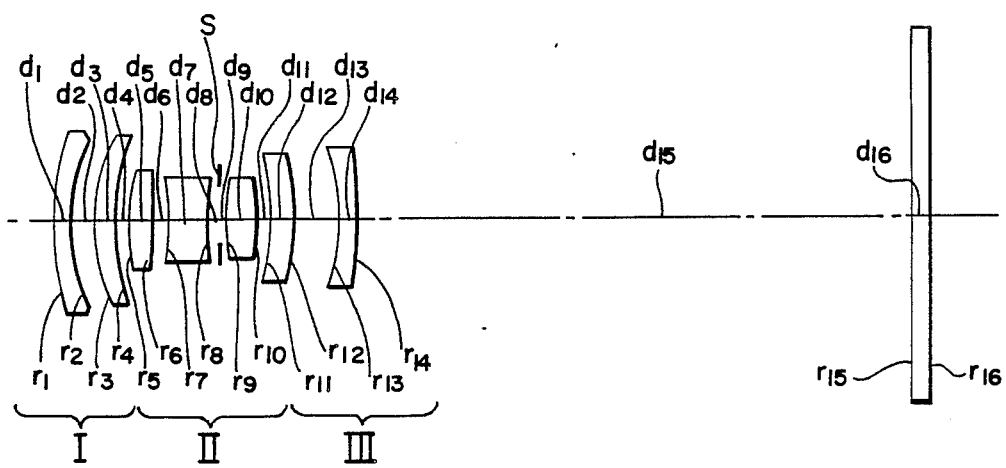
FIGS. 2A and 2B are diagrams in section showing a zoom lens system applying a second embodiment of the present invention at the longest focal length side and at the shortest focal length side, respectively.
Figure 2B:
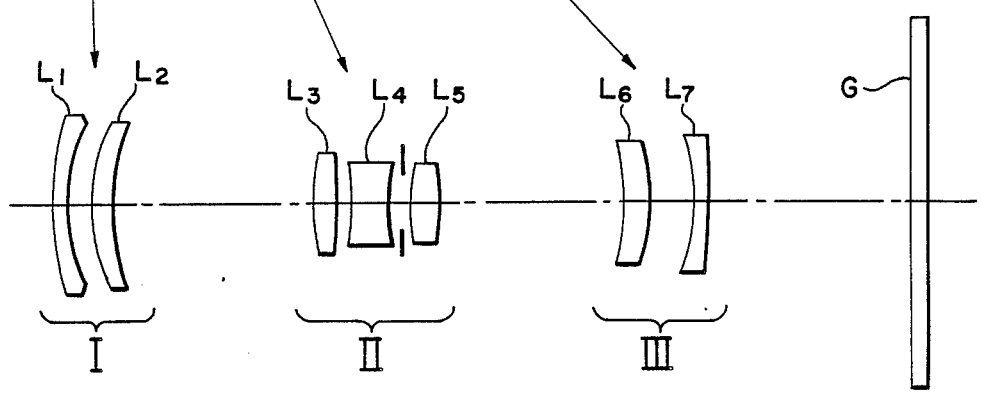
Figure 3A:
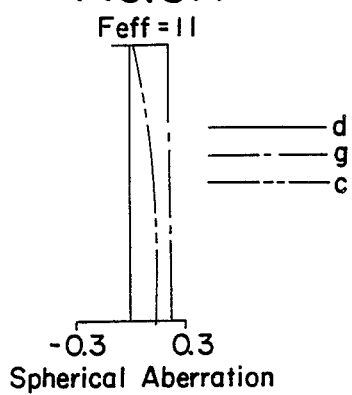
FIGS. 3A to 3C are diagrams showing aberration curves of the first embodiment at 10×.
Figure 3B:
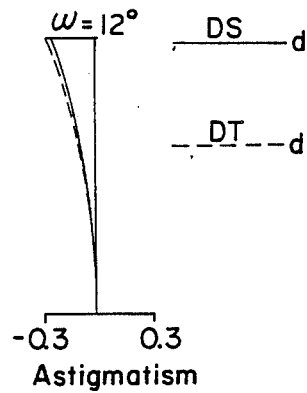
Figure 3C:
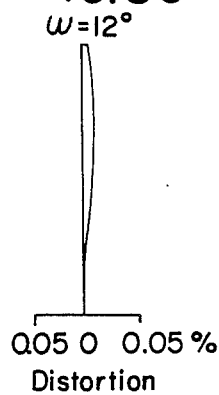
Figure 4A:
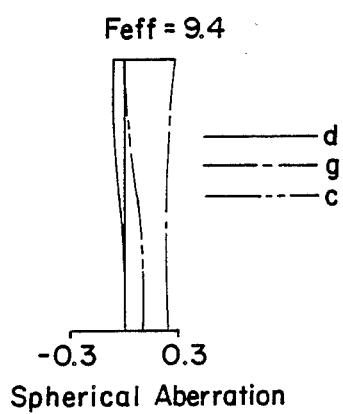
FIGS. 4A to 4C are diagrams showing aberration curves of the first embodiment at 12.5×.
Figure 4B:
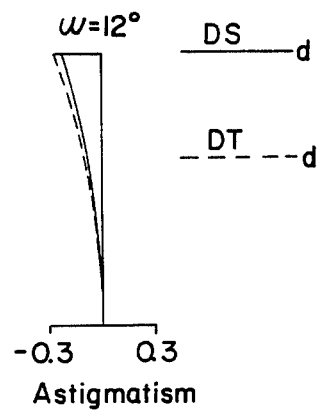
Figure 4C:
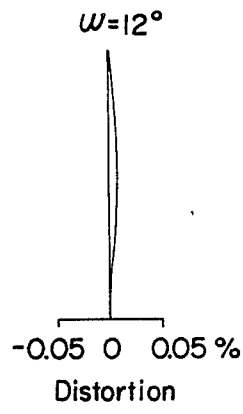
Figure 5A:
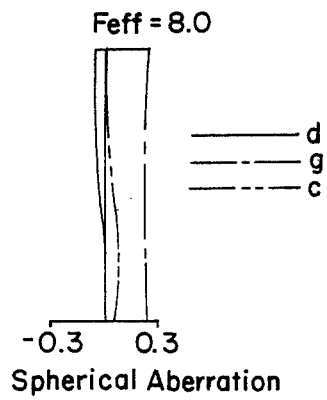
FIGS. 5A to 5C are diagrams showing aberration curves of the first embodiment at 15×.
Figure 5B:
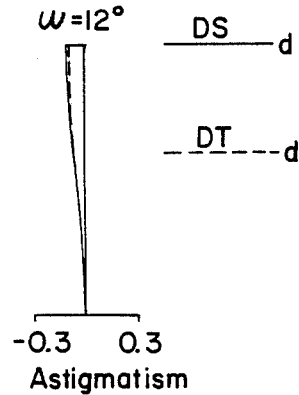
Figure 5C:
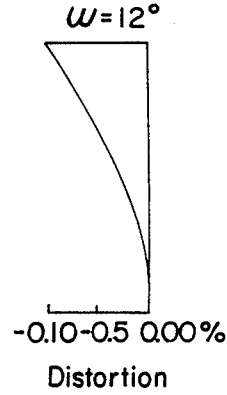
Figure 6A:
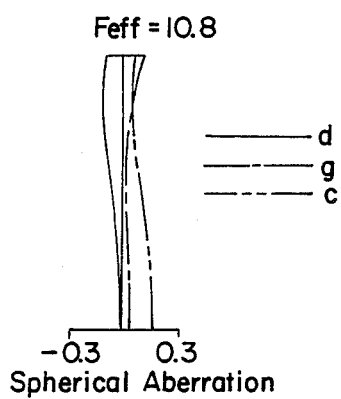
FIGS. 6A to 6C are diagrams showing aberration curves of the second embodiment at 10×.
Figure 6B:
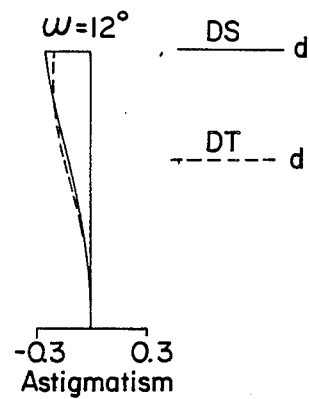
Figure 6C:
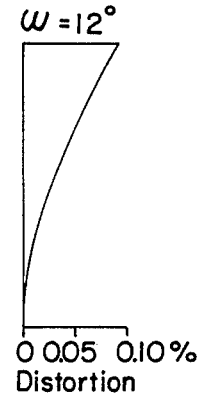
Figure 7A:
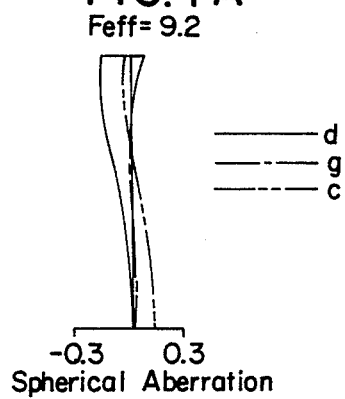
FIGS. 7A to 7C are diagrams showing aberration curves of the second embodiment at 12.5×.
Figure 7B:
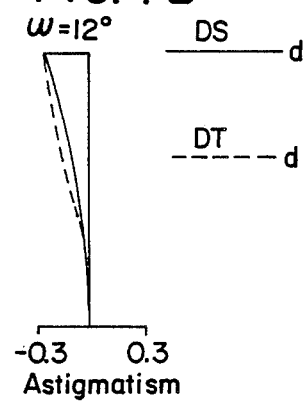
Figure 7C:
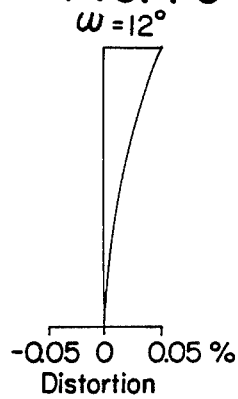
Figure 8A:
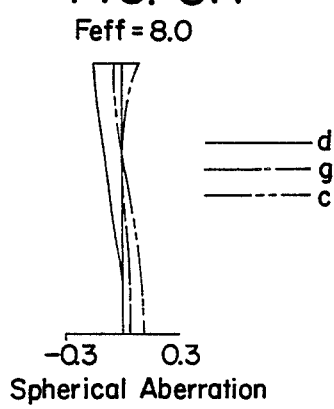
FIGS. 8A to 8C are diagrams showing aberration curves of the second embodiment at 15×.
Figure 8B:
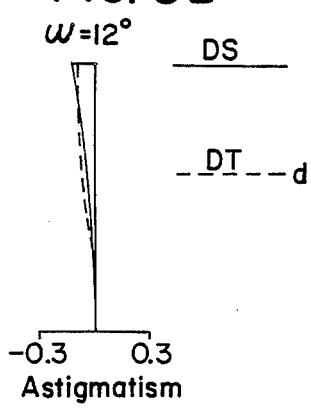
Figure 8C:
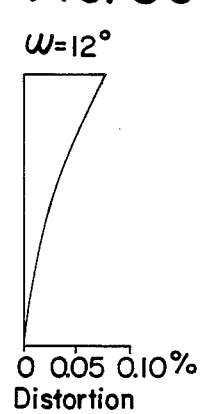

FIGS. 1A and 1B show a zoom lens system applying a first embodiment of the present invention at the longest focal length side and at the shortest focal length side, respectively, while FIGS. 2A and 2B show a zoom lens system applying a second embodiment of the present invention at the longest focal length side and at the shortest focal length side, respectively. The first and second embodiments have the same configuration but different numerical values.

Each of the zoom lens systems of the first and second embodiments comprises, from the enlargement side, a first lens unit I of a negative refractive power, a second lens unit II of a positive refractive power and a third lens unit III of a negative refractive power.

The first lens unit I has, from the enlargement side or image projection side, a first meniscus lens L1 of a negative refractive power with a concave surface faced to the reduction side or microfilm holder side and a second meniscus lens L2 of a positive refractive power with a concave surface faced to the reduction side.

The second lens unit II has, from the enlargement side, a third meniscus lens L3 of a positive refractive power with a convex surface faced to the enlargement side, a bi-concave lens L4 and a bi-convex lens L5.

The third lens unit III has, from the enlargement side, a fourth meniscus lens L6 of a positive refractive power with a concave surface faced to the enlargement side and a fifth meniscus lens L7 of a negative refractive power with a concave surface faced to the enlargement side.

An aperture stop S is positioned between the bi-concave lens L4 and the bi-convex lens L5 in the second lens unit II.

Further, a transparent glass plate G disposed at the right side of the zoom lens system as a microfilm holder supports a microfilm (not shown) on the right side thereof.

Zooming operation from the longest focal length side to the shortest focal length side is carried out by linearly moving both the second lens unit II and the third lens unit III to the reduction side so as to increase a distance d11 between the second and third lens units, while the first lens unit I is held fixed.

The zoom lens system according to the present invention has a substantially symmetrical configuration, that is, the first lens unit I consists of one or more meniscus lens elements each having a concave surface faced to the reduction side and the third lens unit III consists of one or more meniscus lens elements each having a concave surface faced to the enlargement side. Each surface of the lenses of the first and third lens units has a center of curvature at the side of the second lens unit with respect to a top of curvature thereof. Such structure of the present invention reduces distortion and coma aberration as well as variations of these during the zooming operation.

Moreover, the fixed location of the first lens unit reduces the length of the whole zoom lens system to thereby permit it to be compact.

The zoom lens systems of the first and second embodiments, further, fulfill the following condition (1):

(1) $0.8 < (D_C - D_D)/(D_A - D_B) < 2.0$ wherein $D_A$ and $D_B$ are the distances between the first and second lens units at the shortest focal length side and at the longest focal length side, respectively, $D_C$ and $D_D$ are the distances between the second and third lens units at the shortest focal length side and at the longest focal length side, respectively.

The condition (1) is for correction of a distortion and for keeping the size of the zoom lens system in a suitable range. When the lower limit value of the condition (1) is exceeded, a distortion becomes excessive due to increase of the refractive power of the third lens unit III. When the upper limit value thereof is exceeded, the size of the zoom lens system increases in order to obtain a constant image angle since the third lens unit III approaches the microfilm excessively.

The first and second embodiments of the present invention are shown in Tables 1 and 2, respectively. These zoom lens systems have a magnification of $10\times$–$15\times$. The effective F-number Feff of the first and second embodiments are 8.0–11.0 and 8.0–10.8. The telephoto ratio TL/f at the longest focal length side of the first and second embodiments are 1.22 and 1.19. In the embodiments, an aperture efficiency is 100%. FIGS. 3A-3C to 5A-5C are diagrams showing aberration curves of the first embodiment at $10\times$, $12.5\times$ and $15\times$, respectively, while FIGS. 6A-6C to 8A-8C of the second embodiment.

TABLE 1

| | Radius of curvature | Axial distance | Refractive index (Nd) | Abbe number ($\nu$d) |
|---|---|---|---|---|
| | | f = 114.0–94.1–79.6 | | |
| $r_1$ | 41.182 | | | |
| | | $d_1$ 2.200 | $N_1$ 1.80610 | $\nu_1$ 33.27 |
| $r_2$ | 29.035 | | | |
| | | $d_2$ 6.283 | | |
| $r_3$ | 28.868 | | | |
| | | $d_3$ 3.500 | $N_2$ 1.80518 | $\nu_2$ 25.43 |
| $r_4$ | 33.782 | | | |
| | | $d_4$ 2.000–22.880–32.682 | | |
| $r_5$ | 29.991 | | | |
| | | $d_5$ 5.500 | $N_3$ 1.67000 | $\nu_3$ 57.31 |
| $r_6$ | 253.349 | | | |
| | | $d_6$ 3.223 | | |
| $r_7$ | −75.305 | | | |
| | | $d_7$ 8.000 | $N_4$ 1.64769 | $\nu_4$ 33.84 |
| $r_8$ | 28.222 | | | |
| | | $d_8$ 2.814 | | |
| S | | | | |
| | | $d_9$ 2.000 | | |
| $r_9$ | 62.888 | | | |
| | | $d_{10}$ 3.000 | $N_5$ 1.67000 | $\nu_5$ 57.31 |
| $r_{10}$ | −49.135 | | | |
| | | $d_{11}$ 2.500–28.213–60.080 | | |
| $r_{11}$ | −47.300 | | | |
| | | $d_{12}$ 4.238 | $N_6$ 1.74330 | $\nu_6$ 49.22 |
| $r_{12}$ | −33.749 | | | |
| | | $d_{13}$ 4.669 | | |
| $r_{13}$ | −32.298 | | | |
| | | $d_{14}$ 2.868 | $N_7$ 1.48749 | $\nu_7$ 70.44 |
| $r_{14}$ | −123.192 | | | |
| | | $d_{15}$ 94.198–47.563–5.900 | | |
| $r_{15}$ | ∞ | | | |
| | | $d_{16}$ 3.000 | $N_8$ 1.51680 | $\nu_8$ 64.20 |
| $r_{16}$ | ∞ | | | |

$(D_C - D_D)/(D_A - D_B) = 1.88$

TABLE 2

| | Radius of curvature | Axial distance | Refractive index (Nd) | Abbe number ($\nu$d) |
|---|---|---|---|---|
| | | f = 113.8–94.0–79.8 | | |
| $r_1$ | 48.179 | | | |
| | | $d_1$ 2.200 | $N_1$ 1.83400 | $\nu_1$ 37.34 |
| $r_2$ | 29.867 | | | |
| | | $d_2$ 4.390 | | |
| $r_3$ | 29.577 | | | |
| | | $d_3$ 3.500 | $N_2$ 1.75520 | $\nu_2$ 27.51 |
| $r_4$ | 39.156 | | | |
| | | $d_4$ 2.043–21.483–33.754 | | |
| $r_5$ | 29.022 | | | |
| | | $d_5$ 4.000 | $N_3$ 1.69680 | $\nu_3$ 55.43 |
| $r_6$ | 338.915 | | | |
| | | $d_6$ 2.410 | | |
| $r_7$ | −54.049 | | | |
| | | $d_7$ 6.790 | $N_4$ 1.64769 | $\nu_4$ 33.88 |
| $r_8$ | 29.959 | | | |
| | | $d_8$ 2.000 | | |
| S | | | | |
| | | $d_9$ 1.500 | | |
| $r_9$ | 81.060 | | | |
| | | $d_{10}$ 4.950 | $N_5$ 1.69680 | $\nu_5$ 55.43 |
| $r_{10}$ | −39.251 | | | |
| | | $d_{11}$ 2.494–15.467–30.718 | | |
| $r_{11}$ | −50.249 | | | |
| | | $d_{12}$ 4.240 | $N_6$ 1.74077 | $\nu_6$ 27.76 |
| $r_{12}$ | −36.674 | | | |
| | | $d_{13}$ 7.410 | | |
| $r_{13}$ | −34.029 | | | |
| | | $d_{14}$ 2.870 | $N_7$ 1.56732 | $\nu_7$ 42.84 |
| $r_{14}$ | −137.546 | | | |
| | | $d_{15}$ 92.766–60.354–32.832 | | |

TABLE 2-continued

| | f = 113.8-94.0-79.8 | | |
|---|---|---|---|
| Radius of curvature | Axial distance | Refractive index (Nd) | Abbe number (νd) |
| $r_{15}$ ∞ | | | |
| | $d_{16}$ 3.000 | $N_8$ 1.51680 | $\nu_8$ 64.20 |
| $r_{16}$ ∞ | | | |

$(D_C - D_D)/(D_A - D_B) = 0.89$

According to the present invention, it is not necessary that the configurations of the three lens units be quite identical with those of the first and second embodiments. Each of the first and third lens units may have one, three or more meniscus lenses. The second lens unit may be different from those of the first and second embodiments.

The aperture stop is disposed within the second lens unit. However, the aperture stop may be disposed in the vicinity of the second lens unit, such as the enlargement side or the reduction side thereof.

What is claimed is:

1. A zoom lens system for use in a microfilm projection apparatus, the zoom lens system consisting of, from an enlargement side, a first lens unit of a negative refractive power, a second lens unit of a positive refractive power and a third lens unit of a negative refractive power and including an aperture stop positioned within said second lens unit or in the vicinity thereof, said first lens unit consisting of one or more meniscus lens elements each having a concave surface faced to a reduction side and said third lens unit consisting of one or more meniscus lens elements each having a concave surface faced to the enlargement side, wherein said second and third lens units are moved to the reduction side along the optical axis while said first lens unit is fixed in an operation of zooming from the longest focal length side to the shortest focal length side.

2. A zoom lens system as claimed in claim 1, wherein the zooming operation from the longest focal length side to the shortest focal length side is carried out by linearly moving both the second lens unit and the third lens unit to the reduction side so as to increase a distance between the second and third lens units.

3. A zoom lens system as claimed in claim 1, wherein the zoom lens system fulfills the following condition:

$$0.8 < (D_C - D_D)/(D_A - D_B) < 2.0$$

wherein $D_A$ and $D_B$ are the distances between the first and second lens units at the shortest focal length side and at the longest focal length side, respectively, $D_C$ and $D_D$ are the distances between the second and third lens units at the shortest focal length side and at the longest focal length side, respectively.

4. A zoom lens system for use in a microfilm projection apparatus, the zoom lens system comprising, from an enlargement side, a first lens unit of a negative refractive power, a second lens unit of a positive refractive power, and a third lens unit of a negative refractive power and including an aperture stop positioned within said second lens unit or in the vicinity thereof, said first lens unit consisting of, from the enlargement side, a first meniscus lens element of a negative refractive power with a concave surface faced to a reduction side and a second meniscus lens element of a positive refractive power with a concave surface faced to the reduction side, and said third lens unit consisting of one or more meniscus lens elements each having a concave surface faced to the enlargement side, wherein said second and third lens units are moved to the reduction side along the optical axis while said first lens unit is fixed in an operation of zooming from the longest focal length side to the shortest focal length side.

5. A zoom lens system for use in a microfilm projection apparatus, the zoom lens system comprising, from an enlargement side, a first lens unit of a negative refractive power, a second lens unit of a positive refractive power, and a third lens unit of a negative refractive power and including an aperture stop positioned within said second lens unit or in the vicinity thereof, said first lens unit consisting of one or more meniscus lens elements each having a concave surface faced to a reduction side, and said third lens unit consisting of, from the enlargement side, a first meniscus lens element of a positive refractive power with a concave surface faced to the of a negative refractive power with a concave surface faced to the enlargement side, wherein said second and third lens units are moved to the reduction side along the optical axis while said first lens unit is fixed in an operation of zooming from the longest focal length side to the shortest focal length side.

6. A zoom lens system for use in a microfilm projection apparatus, the zoom lens system comprising, from an enlargement side, a first lens unit of a negative refractive power, a second lens unit of a positive refractive power, and a third lens unit of a negative refractive power and including an aperture stop positioned within said second lens unit or in the vicinity thereof, said first lens unit consisting of one or more meniscus lens elements each having a concave surface faced to a reduction side, said second lens unit consisting of, from the enlargement side, a meniscus lens element of a positive refractive power with a convex surface faced to the enlargement side, a bi-concave lens element and a bi-convex lens element, and said third lens unit consisting of one or more meniscus lens elements each having a concave surface faced to the enlargement side, wherein said second and third lens units are moved to the reduction side along the optical axis while said first lens unit is fixed in an operation of zooming from the longest focal length side to the shortest focal length side.

7. A zoom lens system as claimed in claim 6, wherein said aperture stop is positioned between the bi-concave lens element and the bi-convex lens element in the second lens unit.

8. A zoom lens system for use in a microfilm projection the zoom lens system comprising, from an enlargement side, a first lens unit of a negative refractive power, a second lens unit of a positive refractive power and a third lens unit of a negative refractive power and including an aperture stop positioned within said second lens unit, said first lens unit consisting of, from the enlargement side, a first meniscus lens element of a negative refractive power with a concave surface faced to a reduction side and a second meniscus lens element of a positive refractive power with a concave surface faced to the reduction side and said third lens unit consisting of, from the enlargement side, a third meniscus lens element of a positive refractive power with a concave surface faced to the enlargement side and a fourth meniscus lens element of a negative refractive power with a concave surface faced to the enlargement side, wherein said second and third lens units are moved to the reduction side along the optical axis while said first lens unit is fixed in an operation of zooming from the longest focal length side to the shortest focal length side.

9. A zoom lens system as claimed in claim 8, wherein said second lens unit consists of, from the enlargement side, a fifth meniscus lens element of a positive refractive power with a convex surface faced to the enlargement side, a bi-concave lens element and a bi-convex lens element.

10. A zoom lens system as claimed in claim 9, wherein said aperture stop is positioned between the bi-concave lens element and the bi-convex lens element in the second lens unit.

11. A zoom lens system as claimed in claim 8, wherein the zooming operation from the longest focal length side to the shortest focal length side is carried out by linearly moving both the second lens unit and the third lens unit to the reduction side so as to increase a distance between the second and third lens units.

12. A zoom lens system as claimed in claim 8, wherein the zoom lens system fulfills the following condition:

$$0.8 < (D_C - D_D)/(D_A - D_B) < 2.0$$

wherein $D_A$ and $D_B$ are the distances between the first and second lens units at the shortest focal length side and at the longest focal length side, respectively, $D_C$ and $D_D$ are the distances between the second and third lens units at the shortest focal length side and at the longest focal length side, respectively.

* * * * *